United States Patent
Sakazaki et al.

(10) Patent No.: US 7,231,941 B2
(45) Date of Patent: Jun. 19, 2007

(54) HOSE FOR TRANSPORTING FLUID (75) Inventors: Kazushige Sakazaki, Komaki (JP); Koji Hioki, Ichinomiya (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 11/356,307

(22) Filed: Feb. 16, 2006

(65) Prior Publication Data
US 2006/0185748 A1  Aug. 24, 2006

(30) Foreign Application Priority Data
Feb. 18, 2005 (JP) .............................. 2005-043191

(51) Int. Cl.
*F16L 11/04* (2006.01)

(52) U.S. Cl. .................. 138/109; 138/137; 138/145; 138/140

(58) Field of Classification Search ............ 138/109, 138/137, 140, 141, 145, 146
See application file for complete search history.

(56) References Cited

U.S. PATENT DOCUMENTS

| 4,034,994 | A | * | 7/1977 | Ohta et al. ................ 277/625 |
| 4,110,144 | A | * | 8/1978 | Buehler et al. ............. 156/173 |
| 4,313,629 | A | * | 2/1982 | Winterhalter ................ 285/242 |
| 5,518,035 | A | * | 5/1996 | Hoshishima et al. ........ 138/109 |
| 5,823,231 | A | * | 10/1998 | Kawasaki .................... 138/109 |
| 6,712,098 | B2 | * | 3/2004 | Sakazaki et al. ............ 138/109 |
| 2003/0221735 | A1 | * | 12/2003 | Kumagai et al. ........... 138/109 |

FOREIGN PATENT DOCUMENTS

| JP | 2002-54779 | 11/1996 |
| JP | A08-294979 | 2/2002 |

* cited by examiner

*Primary Examiner*—Patrick F. Brinson
(74) *Attorney, Agent, or Firm*—Andrus, Sceales, Starke & Sawall, LLP (57) ABSTRACT

A hose for transporting a fluid has a tubular hose body, an inner resin layer as a barrier layer having permeation resistance to a fluid transported, and an elastic sealing layer coating in membrane an inner surface of a connecting end portion of the hose. The elastic sealing layer provides a seal between the connecting end portion and the mating pipe by elastic contact with the mating pipe.

8 Claims, 8 Drawing Sheets

HOSE FOR TRANSPORTING FLUID

BACKGROUND OF THE INVENTION

1. Field of the Invention

The present invention relates to a hose for transporting a fluid, specifically a hose with elastic sealing layer for transporting a fluid, which is suitable for a hose for transporting a fuel in a motor vehicle or the like, and relates to a method for producing the same.

2. Description of the Related Art

Typical rubber hoses have been used conventionally for transporting a fuel in motor vehicles in view of high vibration-absorbability, easy assembling or the like. Such rubber hoses are, for example, made of a blend of acrylonitrile butadiene rubber and polyvinyl chloride (NBR/PVC) that is excellent in permeation resistance to gasoline. However, for the purpose of global environment protection, the regulations have been recently tightened against permeation of a fuel for motor vehicles or the like, and are anticipated to be further tightened in the future.

In order to provide a hose for transporting a fuel of a motor vehicle with permeation resistance to a fuel, the hose is configured such that a hard resin layer having permeation resistance to a fuel is laminated and formed on an inner side of a tubular hose body made of an elastic material such as rubber. The hard resin layer serves as a barrier layer against permeation of a fuel.

Although such type of the hose has been proposed and used conventionally, as the resin layer having permeation resistance to a fuel is made of hard material, when a rigid mating pipe such as a metal pipe is fitted directly in an inner surface of the resin layer, a sealing property becomes insufficient between the mating pipe and the hose for transporting a fuel, specifically the resin layer on an inner surface of the hose. And, in order to fit the mating pipe into an opening of an axial end of the hose, a great force is required, and this causes a problem that workability (workability is a property regarding to the ease with that the mating pipe is fitted in the hose) is deteriorated.

Figure 5A:
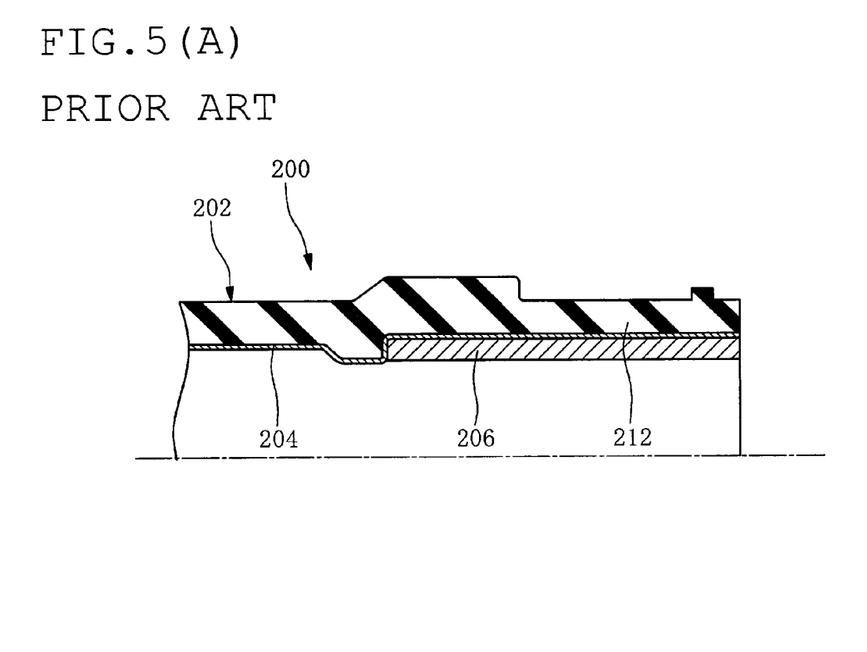

Under the circumstances, a connecting structure as shown in FIG. 5 (A) is previously proposed (Patent Document 1, below).

In FIG. 5 (A), reference numeral 200 indicates a hose for transporting a fuel (hereinafter simply referred to as a hose), reference numeral 202 indicates a tubular hose body made of rubber, reference numeral 204 indicates a hard resin layer as a permeation barrier layer laminated and formed on an inner surface of the tubular hose body 202. The resin layer 204 has permeation resistance to a fuel.

Here, the resin layer 204 is laminated and formed on the inner surface of the tubular hose body 202 up to an axial end of the tubular hose body 202 or the hose 200.

Figure 5B:
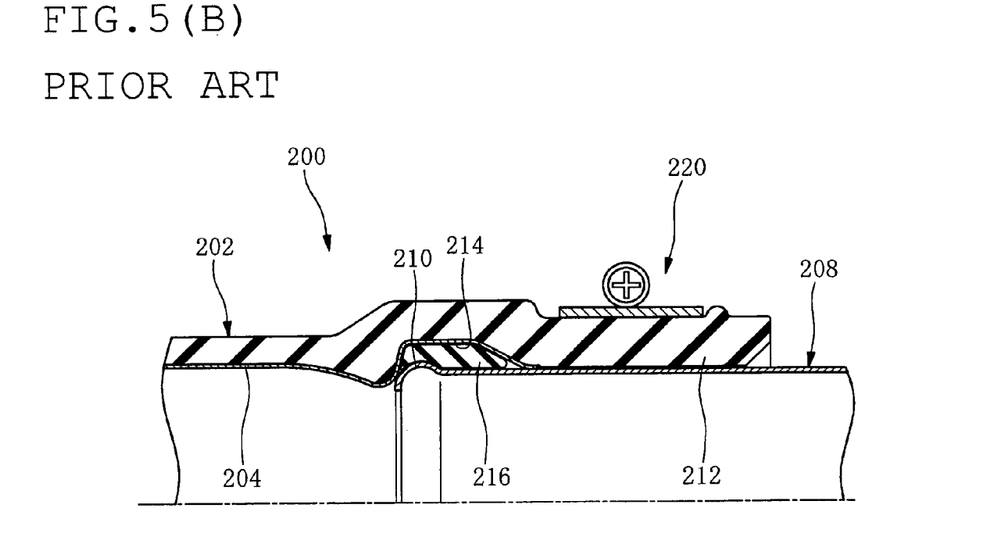

In this connecting structure, a connecting end portion 212 of the hose 200, which is connected to a rigid mating pipe 208 as shown in FIG. 5 (B), is provided with a long tubular sealing rubber 206 having permeation resistance to a fuel on an inner surface thereof. The sealing rubber 206 is formed or molded on an inner surface of the resin layer 204 in the connecting end portion 212, and then is vulcanized and adhered integrally to the inner surface of the resin layer 204. The mating pipe 208 is fitted in the resin layer 204 via the sealing rubber 206. The mating pipe 208 and the resin layer 204 are fitted to each other via the sealing rubber 206.

In this connecting structure, compared to a connecting structure in which the mating pipe 208 is inserted directly in the resin layer 204, sealing property is good, and workability of fitting of the mating pipe 208 in the hose 200 is improved.

However, in the hose connecting structure as shown in FIG. 5 (A), as the sealing rubber 206 is made of an expensive material that has permeation resistance to a fuel, the hose 200 costs high.

Patent Document 2 below discloses a connecting structure in which this problem is improved.

Figure 5C:
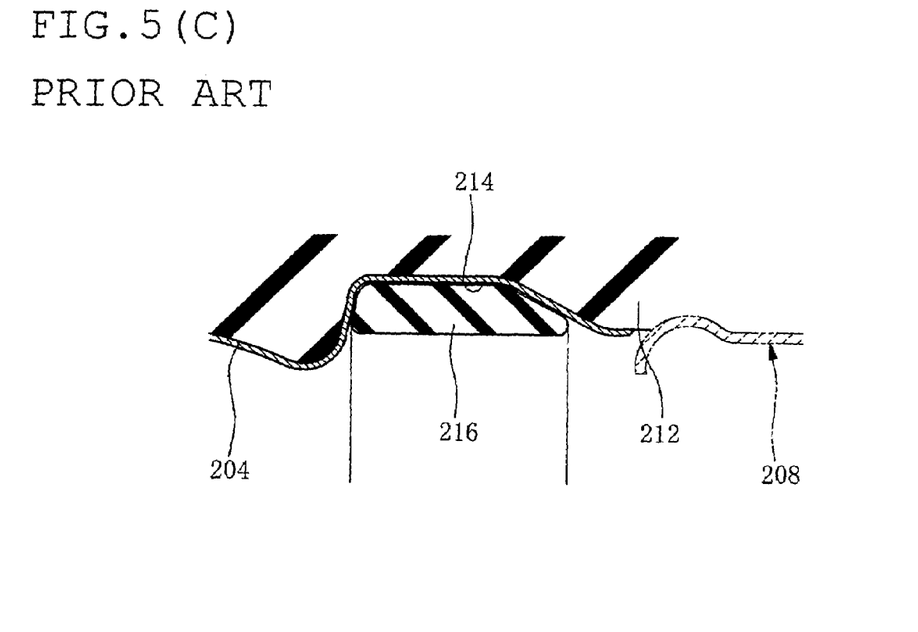

FIGS. 5 (B) and (C) show this specific example.

As shown in FIG. 5 (B), in this connecting structure, an annular recessed part 214 is formed in an inner surface of the resin layer 204 near or toward a leading end thereof, an elastic sealing ring 216 having permeation resistance to a fuel is fitted in the annular recessed part 214, and the mating pipe 208 is fitted or disposed in an inner surface of the elastic sealing ring 216 in contact relation.

Here, the mating pipe 208 is provided with an annular bulged portion 210 bulged radially outwardly on a leading end portion of an inserting side thereof. The bulged portion 210 bites in an inner side of the elastic sealing ring 216 so as to elastically compress the elastic sealing ring 216 radially outwardly.

Meanwhile, in an inner surface of the hose 200, a raised portion raised downwardly in the figure, namely raised radially inwardly is formed. The raised portion abuts the leading end portion of the mating pipe 208 in the axial direction and thereby defines a fit-in length of the mating pipe 208. Namely, the mating pipe 208 relatively fits in the hose 200 until the leading end portion abuts the raised portion In FIGS. 5 (B) and (C), reference numeral 220 indicates a clamp member, and the connecting end portion 212 of the tubular hose body 202 is fastened on an outer surface thereof by the clamp member 220 in a diametrically contracting direction, and securely fixed to the mating pipe 208, namely clamped to the mating pipe 208.

In the connecting structure in FIGS. 5 (B) and (C), the elastic sealing ring 216 is attached in the annular recessed part 214 in fit-in relation in a following manner.

Figure 6A:
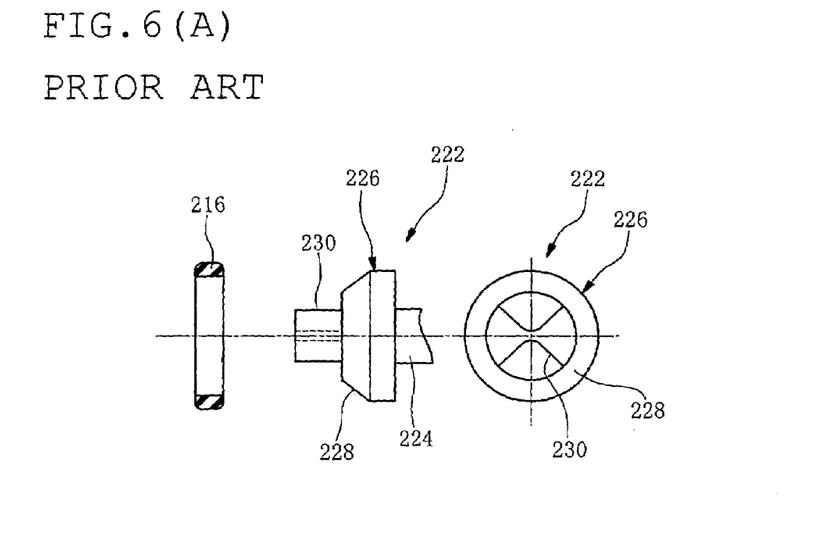
Figure 6B:
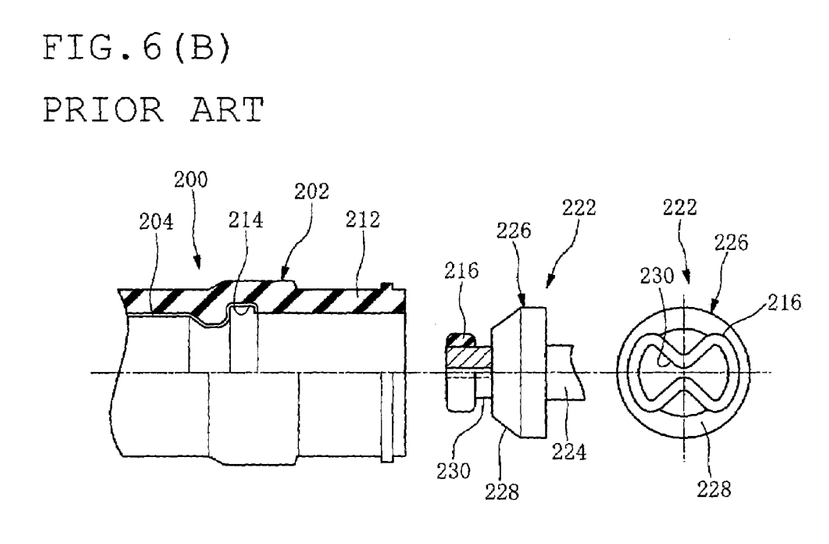

FIG. 6 illustrates this manner concretely.

In FIG. 6 (A), reference numeral 222 indicates an attachment jig for the elastic sealing ring 216. The attachment jig 222 has a rod portion 224 and a disk-like press portion 226 on a leading end portion thereof.

Here, the press portion 226 includes a tapered surface 228 on a left side thereof in the figure, namely on a front surface side.

The attachment jig 222 also has a holder portion 230 on a left side in the figure, namely on a leading end with respect to the press portion 226. The holder portion 230 includes an outer periphery shaped in a figure "8".

Here, the elastic sealing ring 216 is deformed and held in the shape of the figure "8" on the holder portion 230. The attachment jig 222 is pushed and inserted in the connecting end portion 212 while diametrically expanding the connecting end portion 212 of the hose 200 by the disk-like press portion 226. At the time when the elastic sealing ring 216 reaches a position of the annular recessed part 214, the elastic sealing ring 216 held on the holding portion 230 is released from the holder portion 230 to seat in the annular recessed part 214 by rotating the attachment jig 222. Thereby the elastic sealing ring 216 is attached in the annular recessed part 214.

In the connecting structure shown in FIGS. 5 (B) and (C), a cost of material required for the elastic sealing ring 216 is low, as usage of the material is less, compared to that for the sealing rubber 206 in the connecting structure as shown in FIG. 5 (A). However, as the elastic sealing ring 216 is a molded article or molded part similarly to the sealing rubber 206 shown in FIG. 5 (A), there is a following problem in the elastic sealing ring 216. Namely, a cost required for molding the elastic sealing ring 216 is high, and a separate or further step is required for attaching such elastic sealing ring 216 in the inner surface of the connecting end portion 212 of the hose 200, specifically in the annular recessed part 214 in fit-in relation.

Further, this attachment step is complicated and accompanied by troubles. In addition, the elastic sealing ring 216 is shaped of a ring as its name suggests, and possibly is kinked during attachment. So, attachment of the elastic sealing ring 216 should be done successfully, and otherwise there is a fear of defective attachment.

Thus, there is also a problem that an inspection step following the attachment step is essential for inspecting whether the elastic sealing ring 216 is attached correctly in a predetermined location and attached in a correct attachment form. So, this involves a problem that an overall cost for connecting procedure including the attachment step and the inspection step is still not low sufficiently.

The above explanation is given, taking a hose for transporting a fuel as an example. However, this problem could occur in common to such hose as includes an inner layer of resin as a barrier layer having permeation resistance to a fluid transported in order to restrain the fluid transported from permeating.

[Patent Document 1] JP-A, 8-294979
[Patent Document 2] JP-A, 2002-54779

The present invention is made under the foregoing circumstances. It is an object of the present invention to provide a hose for transporting a fluid that requires low cost for a structure for connection to a mating pipe, and to provide a method for producing such hose for transporting a fluid.

SUMMARY OF THE INVENTION

In order to achieve a foregoing object, there is provided a novel hose for transporting a fluid. The hose for transporting a fluid has a connecting end portion in which a rigid mating pipe is fitted for connection with the hose. The mating pipe is provided with an annular bulged portion that is bulged radially outwardly. The hose comprises a tubular hose body, an inner resin layer on an inner side of the tubular hose body as a barrier layer and an elastic sealing layer on an inner surface of the connecting end portion of the hose. The barrier layer has permeation resistance to a fluid transported. The elastic sealing layer provides a seal between the connecting end portion of the hose and the mating pipe by elastic contact with an outer surface of the mating pipe. The elastic sealing layer coats in membrane the inner surface of the connecting end portion. The elastic sealing layer is formed, for example, by being coated or applied on the inner surface of the connecting end portion According to one aspect of the present invention, the elastic sealing layer is disposed partly in an axial direction on the inner surface of the connecting end portion so as to contact with the bulged portion of the mating pipe, namely the bulged portion of the mating pipe that is fitted in and connected to the hose or the connecting end portion According to one aspect of the present invention, the elastic sealing layer may be 10 μm to 200 μm in membrane thickness.

According to one aspect of the present invention, the hose is used for transporting a fuel in a motor vehicle.

According to one aspect of the present invention, the tubular hose body is made of rubber, the inner resin layer as the barrier layer having permeation resistance to a fuel is harder than the tubular hose body, and is laminated on an inner side of the tubular hose body.

According to the present invention, there is provided a novel method for producing the above mentioned hose for transporting a fluid. The method (first method) comprises a step of closing an opening of the connecting end portion of the hose with a cap prior to formation of the elastic sealing layer, and placing the hose with the connecting end portion downwardly, a step of supplying a coating fluid in a tank through the cap inside the connecting end portion via a supply pipe of the coating fluid, and filling the coating fluid inside the connecting end portion up to a targeted height. The coating fluid includes a material of the elastic sealing layer and a solvent. The targeted height means a height to an inner edge of the elastic sealing layer to be formed along an axial direction or longitudinal direction of the hose. The method for producing the hose further comprises a step of coating the inner surface of the connecting end portion with the coating fluid by draining the coating fluid from inside the connecting end portion after that, and a step of forming the elastic sealing layer that coats in membrane the inner surface of the connecting end portion by dispersing and removing the solvent in the coating fluid on the inner surface after that. The elastic layer is in a form of a coating.

According to the present invention, there is also provided a novel method for producing the above mentioned hose for transporting a fluid where the elastic sealing layer is disposed partly in the axial direction on the inner surface of the connecting end portion so as to contact with the bulged portion of the mating pipe or the bulged portion of the mating pipe fitted in and connected to the hose or the connecting end portion. The method (second method) comprises a step of closing an opening of the connecting end portion of the hose with a cap prior to formation of the elastic sealing layer and placing the hose with the connecting end portion downwardly, and a step of supplying a coating fluid in a tank through the cap inside the connecting end portion via a supply pipe of the coating fluid and filling the coating fluid inside the connecting end portion up to a targeted height. The targeted height means a height to an inner edge of the elastic sealing layer to be formed along an axial direction or longitudinal direction of the hose. Here, the inner surface of the connecting end portion is masked from a position of the opening to a predetermined height with a cylindrical body that is closely fitted on the inner surface. The coating fluid is supplied inside the connecting end portion with the inner surface masked by the cylindrical body. The predetermined height means a height to an outer edge of the elastic sealing layer to be formed along an axial direction or longitudinal direction of the hose. The coating fluid includes a material of the elastic sealing layer and a solvent. The method further comprises a step of coating the inner surface of the connecting end portion with the coating fluid partly in the axial direction by draining the coating fluid from inside the connecting end portion after that, and a step of forming the elastic sealing layer that coats in membrane the inner surface of the connecting end portion partly in the axial direction by dispersing and removing the solvent in the coating fluid on the inner surface after that.

According to one aspect of the present invention, the cylindrical body is provided integrally on the cap.

As stated above, according to the present invention, the elastic sealing layer on the inner surface of the connecting end portion of the hose (hose for transporting a fluid) is in a form of a membranous coating. Such elastic sealing layer elastically contacts the outer surface of the mating pipe and thereby provides a seal between the connecting end portion of the hose and the mating pipe. The hose according to the present invention does not require molded articles or parts such as the long tubular sealing rubber 206 as shown in FIG. 5 (A) and the elastic sealing ring 216 as shown in FIGS. 5 (B) and (C) to provide a seal between the connecting end portion and the mating pipe. Therefore, may be eliminated not only the cost required for the molded article itself but also a step of assembling or attaching such molded article in the hose. Thus, man-hour for this assembly or attachment and a step following attachment for inspecting whether the molded article is correctly attached in the hose may be omitted.

On the other hand, according to the present invention, the elastic sealing layer, which forms the membranous coating on the inner surface of the connecting end portion of the hose, favorably provides a seal between the hose and the mating pipe, and thereby a fluid transported may be favorably prevented from leaking outside.

In formation of the elastic sealing layer with a coating, usage of material is a little, and the elastic sealing layer may be easily formed by coating. Therefore, according to the present invention, a cost required for connecting the hose to the mating pipe may be lowered.

In the present invention, the elastic sealing layer may be disposed partly in the axial direction on the inner surface of the connecting end portion so as to coat the region of the connecting end portion in contact with the bulged portion of the mating pipe.

In this configuration, usage of an expensive material for the elastic sealing layer may be further reduced, and a overall cost may be further lowered.

And, usually, the elastic sealing layer having permeation resistance to a fluid transported is not slippery with respect to the mating pipe. In a case that such elastic sealing layer is formed not along an entire axial length of a contact inner surface with the mating pipe and the resin layer is exposed on a region of the inner surface or the contact inner surface of the hose that is not coated with the elastic sealing layer, the advantage is obtained that the hose provides a small resistance to insertion of the mating pipe in the connecting end portion of the hose and the mating pipe may be more favorably inserted relatively in the hose.

The hose of the present invention is suitable specifically for a hose for transporting a fuel in a motor vehicle.

In the first method according to the present invention, may be produced, for example, such hose for transporting a fluid (first hose) that has a connecting end portion in which a rigid mating pipe provided with an annular bulged portion bulged radially outwardly is fitted for connection with the hose and comprises a tubular hose body, an inner resin layer on an inner side of the tubular hose body as a barrier layer having permeation resistance to a fluid transported, and an elastic sealing layer coating in membrane an inner surface of the connecting end portion of the hose and providing a seal between the connecting end portion of the hose and the mating pipe by elastic contact with an outer surface of the mating pipe.

In the second method according to the present invention, may be produced, for example, the same hose for transporting a fuel as the first hose, but where the elastic sealing layer is disposed partly in an axial direction on the inner surface of the connecting end portion so as to contact with the bulged portion of the mating pipe in a connected state. Masking with the cylindrical body is done, for example, when the opening of the connecting end portion of the second hose is closed (with the cap).

In the second method, the cylindrical body may be provided integrally on the cap.

In this configuration, the region to be kept uncoated may be masked with the cylindrical body upon attaching the cap on the connecting end portion of the hose. Thus, it is possible to more easily apply the coating fluid on the inner surface of the connecting end portion. Namely, the elastic sealing layer may be formed in a form of coating more easily.

Now, the preferred embodiments of the present invention will be described in detail with reference to the drawings.

BRIEF DESCRIPTION OF THE DRAWINGS

FIG. 3 (A) is a view for explaining a relevant step of a method for producing the hose.

FIG. 3 (B) is a view for explaining a relevant step of the method for producing the hose following the step of FIG. 3 (A).

FIG. 5 (A) is a view showing a connecting structure of a conventional hose.

FIG. 5 (B) is a view showing a specific example of an improved connecting structure of a conventional hose and a mating pipe.

FIG. 5 (C) is an enlarged sectional view of a relevant part of FIG. 5 (B).

FIG. 6 (A) is a view showing an attachment jig used for attachment of an elastic sealing ring.

FIG. 6 (B) is a view showing how to attach the elastic sealing ring in an annular recessed part of a conventional hose.

DETAILED DESCRIPTIONS OF PREFERRED EMBODIMENTS

Figure 1:
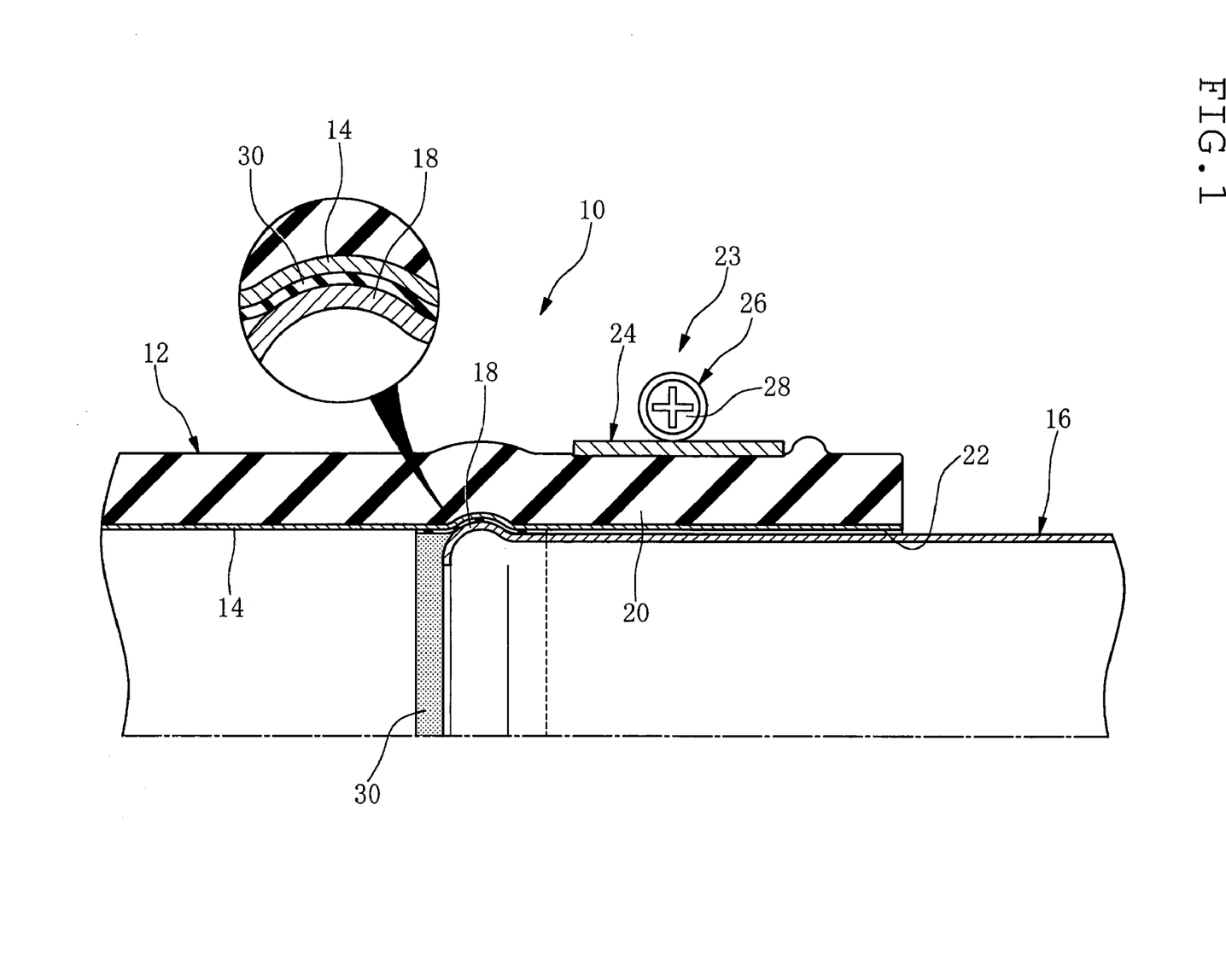
FIG. 1 is a view showing a hose with elastic sealing layer according to one embodiment of the present invention that is connected to a mating pipe.

With reference to FIG. 1, reference numeral 10 indicates a hose for transporting a fuel (hereinafter simply referred to as a hose) in a motor vehicle, reference numeral 12 indicates a tubular hose body made of a rubber elastic material that is a main constituent of the hose 10, and reference numeral 14 indicates a hard resin layer that is laminated on an inner surface of the tubular hose body 12 (thickness of the resin layer is, for example, in a range of 50 µm to 100 µm). The resin layer 14 serves as a barrier layer that has permeation resistance to a fuel.

Reference numeral 16 is a rigid metal mating pipe to be connected to the hose 10. The mating pipe 16 is provided with a bulged portion 18 that is bulged annularly in a radially outward direction, on a leading end portion thereof. The bulged portion 18 has a curvature shape in cross-section or a curved sectional shape.

In a connecting structure shown in FIG. 1, the mating pipe 16 is inserted relatively axially inside the hose 10 through an opening 22 at an axial end of the a connecting end portion 20 of the hose 10, specifically inside the connecting end portion 20, then the connecting end portion 20 is fastened, tightened or clamped by a hose clamp 23 on an outer peripheral surface thereof in a diametrically contracting direction, and thereby the hose 10 is connected to the mating pipe 16 in a locked relation.

Here, the hose clamp 23 has an annular strip-shaped fastening band 24 and a fastening mechanism 26. When a screw 28 is tighten, the fastening band 24 fastens the connecting end portion 20 of the hose 10 in the diametrically contracting direction through the fastening mechanism 26 and the connecting end portion 20 is firmly secured to the mating pipe 16.

In this embodiment, an elastic sealing layer 30 is in a form of a membrane coating on the inner surface of the connecting end portion 20 of the hose 10 to provide a seal with respect to the mating pipe 16 by elastic contact with the outer surface of the mating pipe 16.

Here, the elastic sealing layer 30 is formed not entirely on the inner surface of the connecting end portion 20, namely, is formed not along an entire length of a region of the inner surface in contact with the mating pipe 16, but partly in the axial direction, specifically only on a region of the inner surface in contact with the bulged portion 18 of the mating pipe 16.

Figure 2:
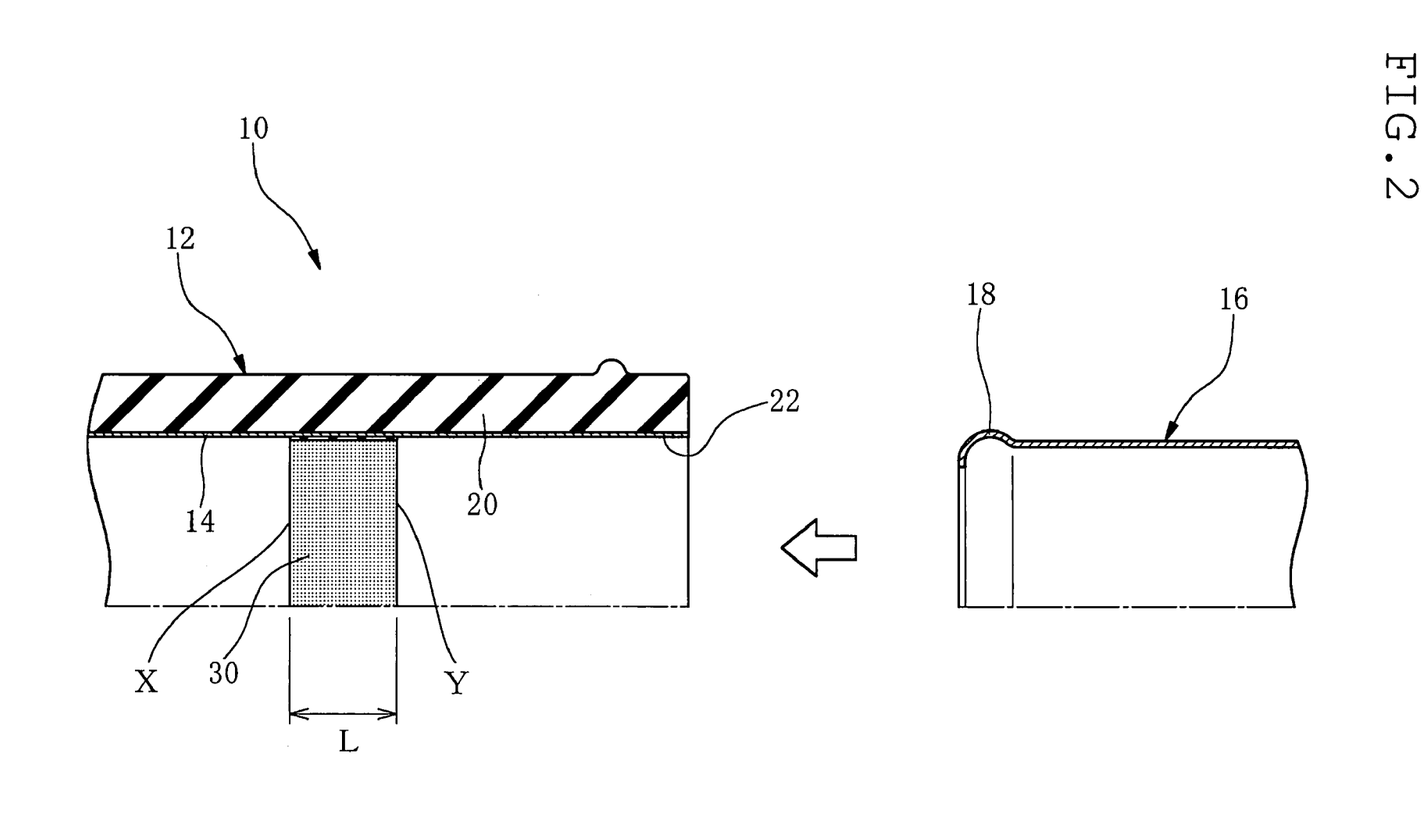
FIG. 2 is a view showing the hose of FIG. 1 prior to connection to the mating pipe.

Specifically, as shown in FIGS. 1 and 2, the coating of the elastic sealing layer 30 is formed partly on a region from a left position to a right position with respect to the bulged portion 18 in the figure, along an axial length of L.

In this embodiment, L is designed 10 mm.

Thus, on the connecting end portion 20, the inner resin layer 14 is exposed to inside the hose 10, on a region that is not coated with the elastic sealing layer 30.

Here, the membranous coating of the elastic sealing layer 30 is of thickness in a range of 10 μm and 200 μm.

Meanwhile, in FIG. 2, reference symbol X indicates an inner edge of the elastic sealing layer 30, and reference symbol Y indicates an outer edge thereof.

In this embodiment, the tubular hose body 12 is preferably made of, for example, fluoro rubber (FKM), acrylonitrile butadiene rubber (NBR), NBR/PVC, hydrogenated acrylonitrile butadiene rubber (H-NBR), epichlorohydrin rubber (ECO), chlorosulfonated polyethylene rubber (CSM) or the like.

The tubular hose body 12 may be formed in a single-layer or multilayered construction. In case of the multilayered construction, rubber material to be used in each layer may be selected in view of climate resistance, fuel resistance, or cost. For example, an outer layer of CSM may be applied to an outer side of a layer of NBR to provide climate resistance, or an inner layer of FKM and an outer layer of NBR/PVC may be applied in view of fuel resistance and cost.

For the resin layer 14 having permeation resistance to a fuel preferably used are, for example, fluorine resin, polyvinylidene fluoride (PVDF), copolymer resin of vinylidene fluoride (for example, copolymer resin of vinylidene fluoride and chlorotrifluoroethylene) or polyester resin (for example, polybutylene naphtahalate (PBN), polybuthylene terephthalete(PBT)), or the like.

On the other hand, for the elastic sealing layer 30 having permeation resistance to fuel, preferably used are, for example, FKM, NBR, NBR/PVC, H-NBR, ECO or the like.

Figure 3A:
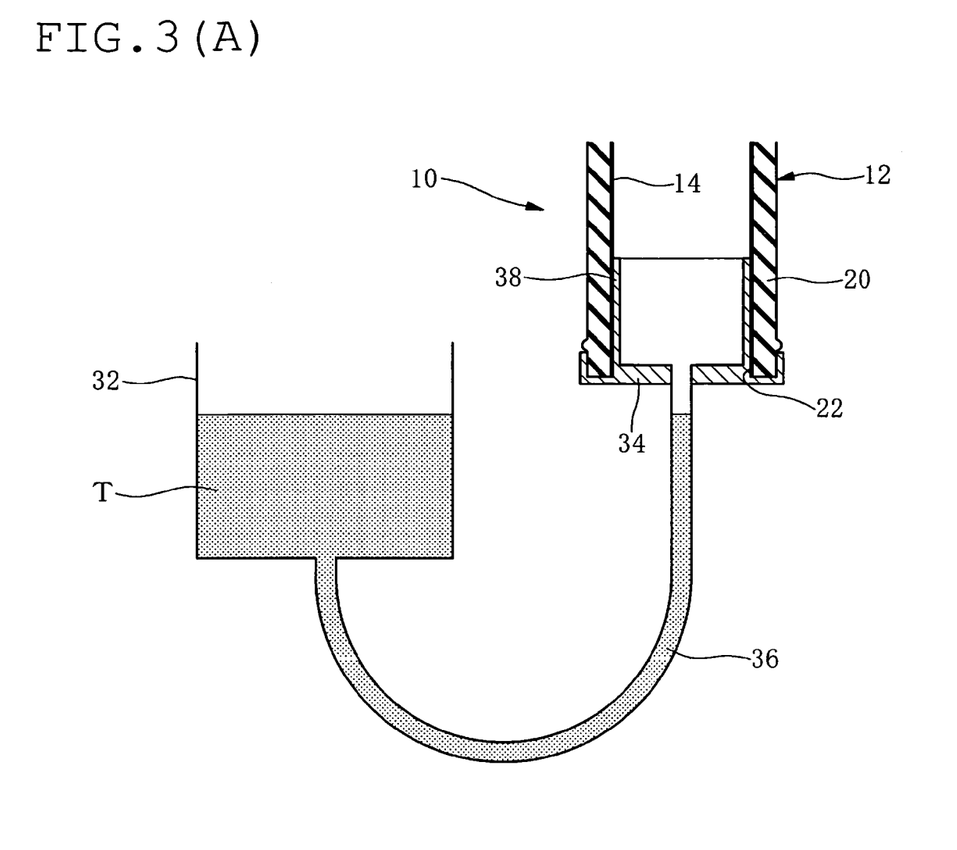
Figure 3B:
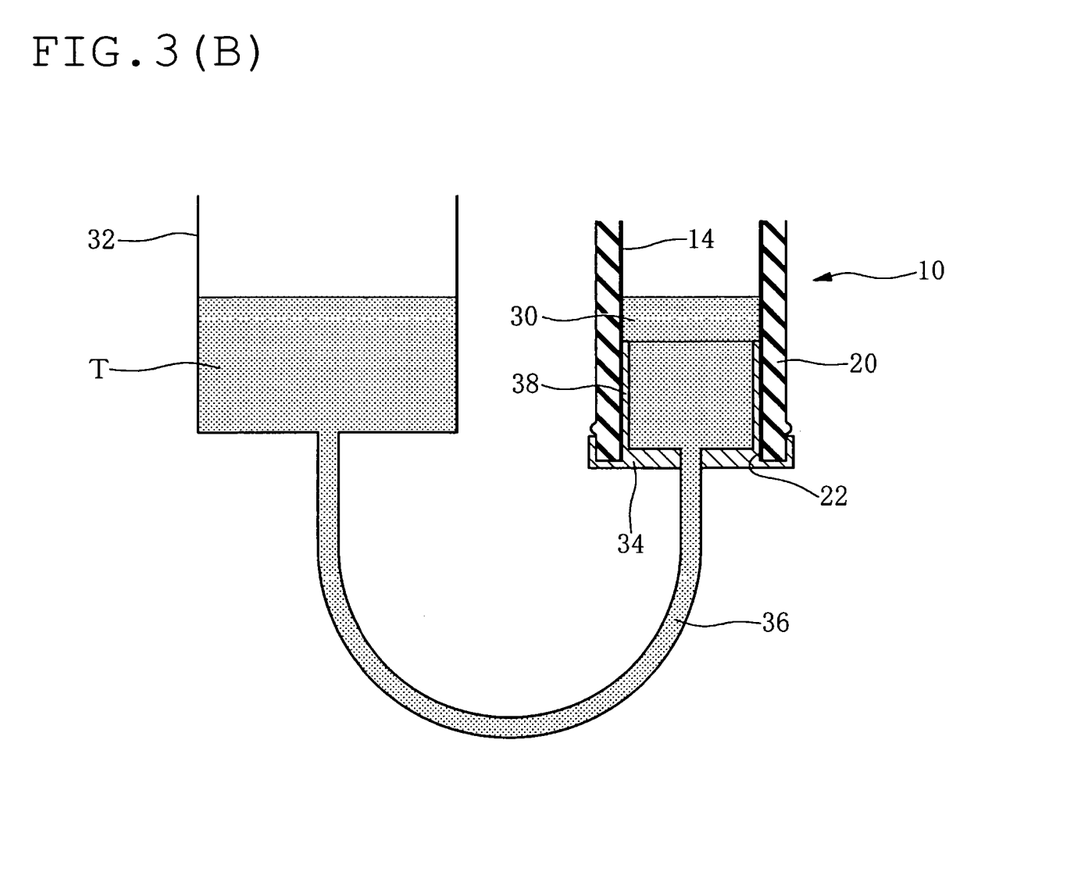

In FIG. 3 that explains a method for forming the elastic sealing layer 30, reference numeral 32 indicates a tank, which contains a coating fluid T inside. The coating fluid T contains material of the elastic sealing layer 30 and solvent, etc..

Reference numeral 34 indicates a cap for closing the opening 22 of the connecting end portion 20 of the hose 10, and reference numeral 36 indicates a supply pipe that extends from the tank 32 for feeding or supplying the coating fluid T in the tank 32.

Reference numeral 38 indicates a cylindrical body that fits on or closely fits on an inner surface of the connecting end portion 20, from a position of an axial end of the connecting end portion 20, namely, the opening 22 to a predetermined height in the figure, for masking the inner surface from the position of the opening 22 to the predetermined height. In this embodiment, the cylindrical body 38 is provided integrally on the cap 34.

In this embodiment, the opening 22 of the connecting end portion 20 of the hose 10 is closed with the cap 34 and the hose 10 is placed with the connecting end portion 20 downwardly. Then, the coating fluid T in the tank 32 is fed or supplied inside the connecting end portion 20 via the supply pipe 36, and is filled inside the connecting end portion 20 up to a targeted height (refer to FIG. 3 (B)). The coating fluid T is supplied to the height exceeding the cylindrical body 38, for example, for the length "L".

Then, the coating fluid T filled inside the connecting end portion 20 is drained, and thereby the coating fluid T can be adhered partly on the inner surface of the connecting end 20 along the length L as mentioned above.

Subsequently, the solvent in the coating fluid T is dispersed and removed, and only the material of the elastic sealing layer 30 is left. Thereby the coating of the elastic sealing layer 30 is formed on the inner surface of the connecting end portion 20 partly, along the length L as mentioned above.

The coating fluid T may be supplied inside the connecting end portion 20, for example, by relatively moving the connecting end portion 20 downwardly with respect to the tank 32. In this manner, a depth of the coating fluid T filled inside the connecting end portion 20 may be adjusted by controlling a relative downward moving distance of the connecting end portion 20 with respect to the tank 32.

Here, it is possible to move the connecting end portion 20 downwardly while the tank 32 is securely fixed or, as the case may be, it is also possible to move the tank 32 upwardly while the connecting end portion 20 is securely fixed.

And, the coating fluid 20 filled inside the connecting end portion 20 may be drained by relatively moving the connecting end portion 20 upwardly with respect to the tank 32.

However, the above is just one example.

In this embodiment, as molded article or molded part such as a long tubular sealing rubber or an elastic sealing ring is not required, the production cost may be reduced. Further, attachment and inspection procedures of the molded article may be eliminated.

In this embodiment, the elastic sealing layer 30 formed in a membranous coating on the inner surface of the connecting end portion 20 of the hose 10, favorably provides a seal between the hose 10 and the mating pipe 16, and a fluid transported is preferably prevented from leaking outside.

Moreover, in this embodiment, the elastic membranous sealing layer 30 is formed on the inner surface of the connecting end portion 20 partly in the axial direction, namely, a region of the inner surface that contacts with the bulged portion 18 of the mating pipe 16. Thus, usage or consumption of an expensive material for the elastic sealing layer 30 may be reduced, and thereby the production cost may be further reduced.

The elastic sealing layer 30 having permeation resistance to a fluid transported is not slippery with respect to the mating pipe 16. As such elastic sealing layer 30 is formed not along an entire axial length of the inner surface in contact with the mating pipe 16 and the resin layer 14 is exposed on a region of this inner surface that is not coated with the elastic sealing layer 30, the hose 10 provides a small resistance to relative insertion of the mating pipe 16 in the connecting end portion 20, and the mating pipe 16 may be more favorably inserted in the hose 10.

According to the method for producing the hose 10 of this embodiment, the coating of the elastic sealing layer 30 may be easily formed only on a region of the inner surface that contacts with the bulged portion 18 of the mating pipe 16.

Figure 4:
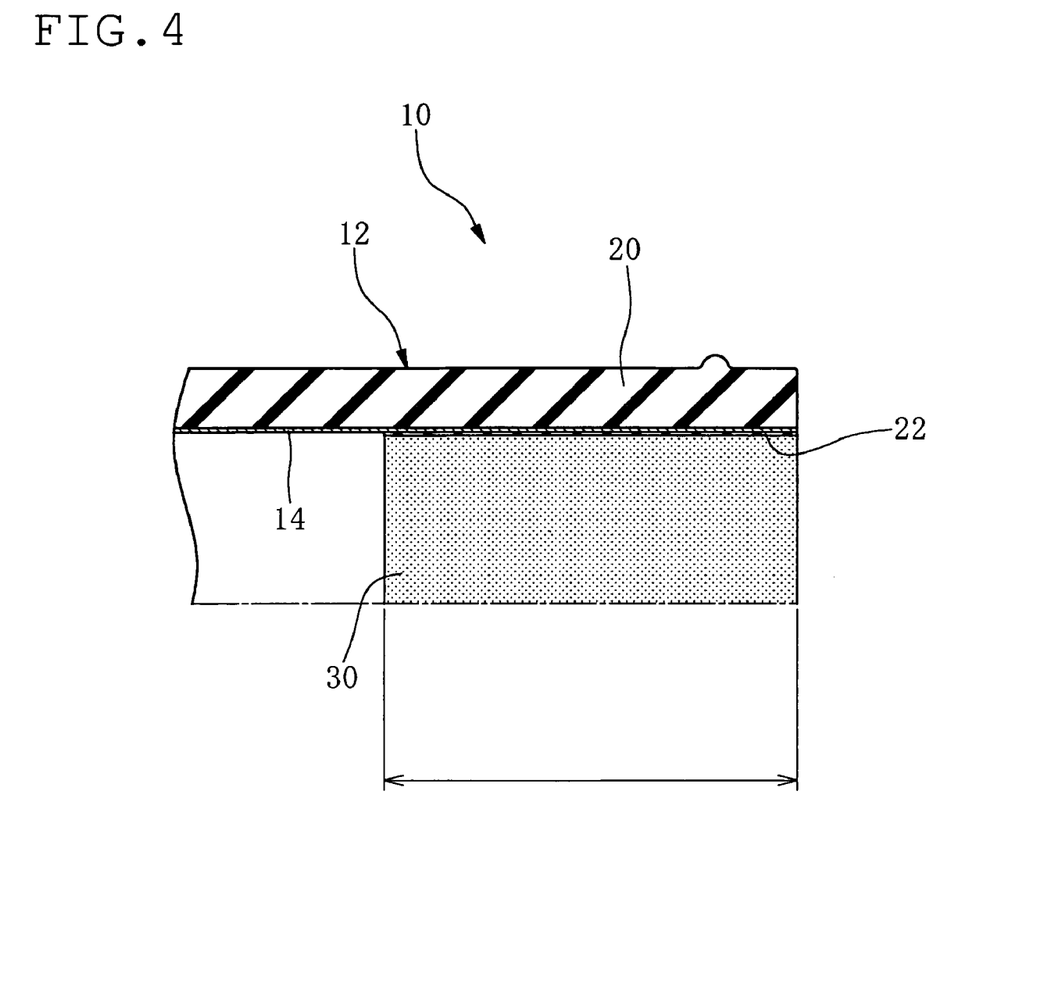
FIG. 4 is a view showing another embodiment of the present invention.

FIG. 4 shows another embodiment of the present invention where a coating of an elastic sealing layer 30 is formed on the inner surface of the connecting end portion 20 up to an axial end thereof.

The coating of the elastic sealing layer 30 may be formed on the inner surface of the connecting end portion 20 entirely, in the method shown in FIG. 3 but with removing the cylindrical body 38 from the cap 34.

Although the preferred embodiments have been described above, these are only some of embodiments of the present invention. The present invention may be adapted for hoses for various applications, other than the hose for transporting a fuel. The present invention may be constructed and embodied in various configurations and modes within the scope of the present invention.

What is claimed is:

1. A hose for transporting a fluid, the hose having a connecting end portion in which a rigid mating pipe provided with an annular bulged portion that is bulged radially outwardly is fitted for connection with the hose, the hose comprising:

an axially elongated tubular hose body, a resin layer on an inner side of the tubular hose body, the resin layer forming a barrier layer having permeation resistance to fluid transported in the hose, and an elastic sealing membrane coating an inner surface of the connecting end portion of the hose, the elastic sealing membrane providing a seal between the connecting end portion of the hose and the mating pipe by elastic contact with an outer surface of the mating pipe, wherein the elastic sealing membrane is disposed on the inner surface of the connecting end portion so as to contact the bulged portion of the mating pipe; and wherein the elastic sealing membrane is axially spaced apart from an outer edge of the connecting end portion of the hose.

2. A hose for transporting a fluid, the hose having a connecting end portion in which a rigid mating pipe provided with an annular bulged portion that is bulged radially outwardly is fitted for connection with the hose, the hose comprising:

an axially elongated tubular hose body, a resin layer on an inner side of the tubular hose body, the resin layer forming a barrier layer having permeation resistance to a fluid transported, and an elastic sealing membrane coating an inner surface of the connecting end portion of the hose, the elastic sealing membrane providing a seal between the connecting end portion of the hose and the mating pipe by elastic contact with an outer surface of the mating pipe, wherein the elastic sealing membrane is 10 µm to 200 µm thick.

3. The hose for transporting a fluid as set forth in claim 1, wherein the resin layer has a constant inner diameter along the length of a connecting end of the hose.

4. The hose for transporting a fluid as set forth in claim 2, wherein the resin layer has a constant inner diameter along the length of a connecting end of the hose.

5. The hose for transporting a fluid as set forth in claim 1, wherein the elastic sealing membrane comprises rubber.

6. The hose for transporting a fluid as set forth in claim 2, wherein the elastic sealing membrane comprises rubber.

7. The hose for transporting a fluid as set forth in claim 1, wherein the hose is arranged to transport fuel in a motor vehicle.

8. The hose for transporting a fluid as set forth in claim 7, wherein the tubular hose body comprises rubber, and the inner resin layer is laminated on the inner side of the tubular hose body so as to comprise a barrier layer having permeation resistance to fuel that is harder than the tubular hose body.

* * * * *